United States Patent
Murphy

(10) Patent No.: US 6,644,689 B2
(45) Date of Patent: Nov. 11, 2003

(54) METHOD FOR SUPPRESSING DEPLOYMENT OF AN INFLATABLE RESTRAINT BASED ON SENSED OCCUPANT CAPACITANCE

(75) Inventor: Morgan D. Murphy, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 126 days.

(21) Appl. No.: 10/068,752

(22) Filed: Feb. 8, 2002

(65) Prior Publication Data

US 2003/0151239 A1 Aug. 14, 2003

(51) Int. Cl.[7] .......................... B60R 21/32; G06F 17/00
(52) U.S. Cl. ........................................ 280/735; 701/45
(58) Field of Search ................................. 280/734, 735; 180/271, 268; 701/95, 45, 46, 47

(56) References Cited

U.S. PATENT DOCUMENTS

| | | | | |
|---|---|---|---|---|
| 5,722,686 A | * | 3/1998 | Blackburn et al. | 280/735 |
| 5,871,232 A | * | 2/1999 | White | 280/735 |
| 6,220,627 B1 | * | 4/2001 | Stanley | 280/735 |
| 6,290,255 B1 | * | 9/2001 | Stanley et al. | 280/735 |
| 6,302,438 B1 | * | 10/2001 | Stopper et al. | 280/735 |
| 6,348,862 B1 | * | 2/2002 | McDonnell et al. | 340/562 |
| 6,438,476 B1 | * | 8/2002 | Gray et al. | 701/45 |
| 6,438,477 B1 | * | 8/2002 | Patterson et al. | 701/45 |
| 6,520,535 B1 | * | 2/2003 | Stanley et al. | 280/735 |
| 6,563,231 B1 | * | 5/2003 | Stanley et al. | 307/10.1 |
| 6,587,770 B1 | * | 7/2003 | Gray et al. | 701/45 |
| 6,598,900 B2 | * | 7/2003 | Stanley et al. | 280/735 |

* cited by examiner

Primary Examiner—Paul N. Dickson
Assistant Examiner—Toan C To
(74) Attorney, Agent, or Firm—Robert M. Sigler; Stephan V. Chmielewski

(57) ABSTRACT

An improved method of selectively suppressing deployment of a vehicular inflatable restraint utilizes both static and dynamic variation in the measured capacitance of a vehicle occupant in a complementary manner that reduces overall system variability. The decision to allow or suppress deployment of the restraint is determined based on a comparison of the static capacitance reading with at least one threshold, and the dynamic variation of the measured capacitance and other parameters such as seat belt tension, seat humidity and seat temperature are used to adjust the threshold in a direction to minimize the overall variability of the system. In a preferred embodiment, the variation of the measured capacitance with respect to the variation in vertical acceleration of the vehicle is used to estimate the free capacitance of the occupant, and such free capacitance is used to adjust the threshold.

9 Claims, 5 Drawing Sheets

US 6,644,689 B2

METHOD FOR SUPPRESSING DEPLOYMENT OF AN INFLATABLE RESTRAINT BASED ON SENSED OCCUPANT CAPACITANCE

TECHNICAL FIELD

This invention relates to a method of allowing or suppressing deployment of an inflatable restraint based on sensed occupant capacitance, and more particularly to a method of taking into account both static and dynamic capacitance data.

BACKGROUND OF THE INVENTION

Vehicle occupant capacitance sensing systems are useful in connection with air bags and other pyrotechnically deployed restraints as a means of characterizing the occupant for purposes of determining whether to allow or suppress deployment of the restraints. For example, it is generally desired to allow deployment for an adult, and to suppress deployment (or reduce deployment force) for a child. However, it has been found that a child occupant can produce a static capacitance reading similar to that of a small adult ($5^{th}$ percentile female) due to variations seat belt tension, the orientation of the occupant on the seat, and the usage of aftermarket seat covers or pads, for example. In other words, the static capacitance readings for a child occupant and a small adult occupant statistically vary over first and second ranges due to system variability, and there can be some amount of overlap between the first and second ranges under certain conditions. Accordingly, what is needed is a method of more reliably distinguishing between those occupants for whom deployment should be suppressed and those for whom deployment should be allowed.

SUMMARY OF THE INVENTION

The present invention is directed to all improved method of selectively suppressing deployment of a vehicular inflatable restraint in which both static and dynamic variation in the measured capacitance of a vehicle occupant are used in a complementary manner that reduces overall system variability. The decision to allow or suppress deployment of the restraint is determined based on a comparison of the static capacitance reading with at least one threshold, and the dynamic variation of the measured capacitance and other parameters such as seat belt tension, seat humidity and seat temperature are used to adjust the threshold in a direction to minimize the overall variability of the system. In the preferred embodiment, the variation of the measured capacitance with respect to the variation in vertical acceleration of the vehicle is used to estimate the free capacitance of the occupant, and such free capacitance is used to adjust the threshold.

DESCRIPTION OF THE PREFERRED EMBODIMENT

The present invention is disclosed in the context of a restraint system for an occupant of a vehicle passenger seat 10, where the occupant capacitance is sensed based on a capacitance sensor 12 (or array of capacitance sensors) in a seat cushion 16. In general, however, the present invention also applies to other types of occupant capacitance sensing systems, such as systems that sense occupant capacitance in a seat back, headliner or any other vehicle location.

Figure 1:
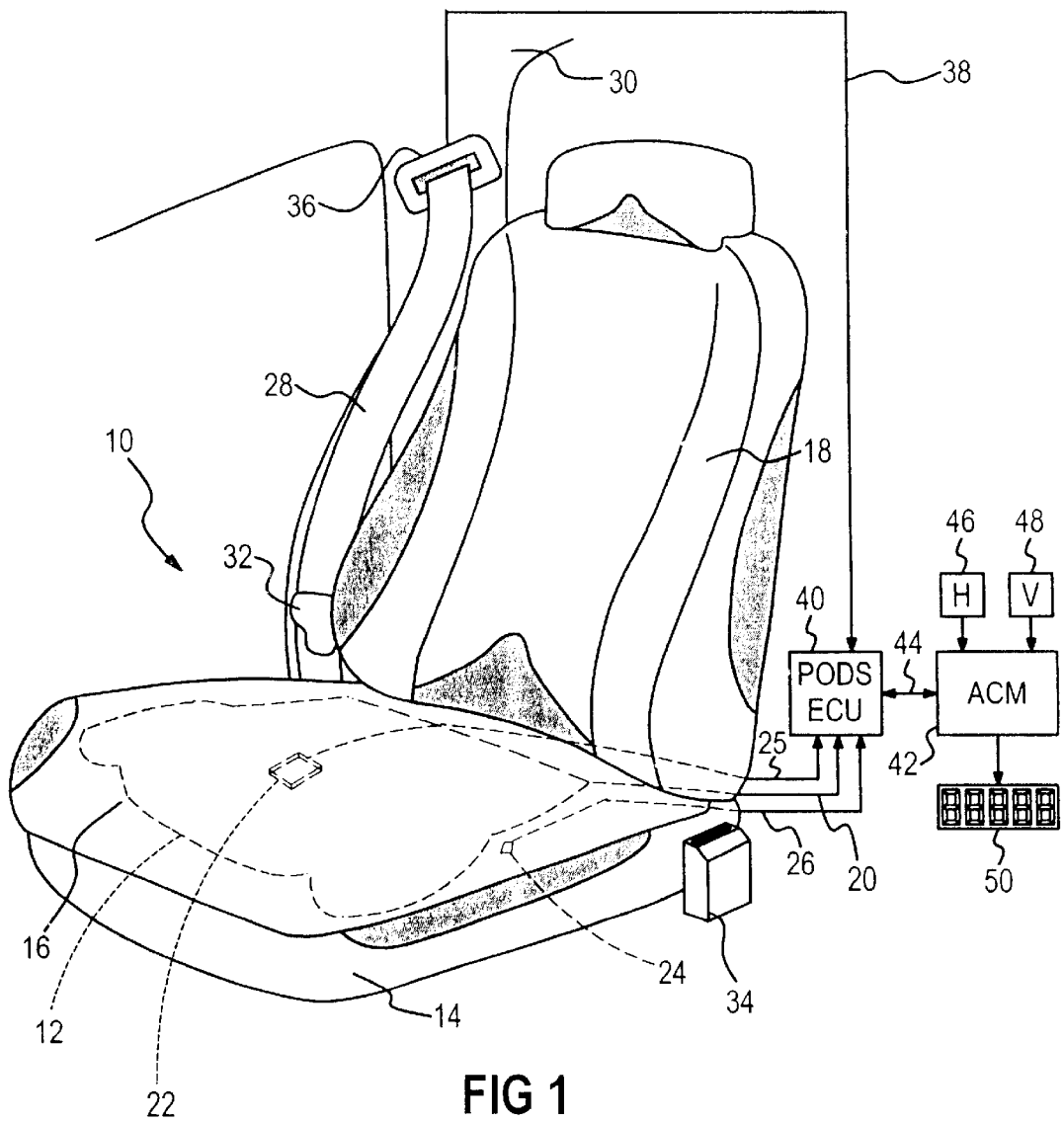
FIG. 1 is a system diagram illustrating a passenger seat of a vehicle equipped with a capacitance sensor, a passenger occupant detection electronic control unit (PODS ECU), an airbag control module (ACM), and vehicle acceleration sensors for characterizing an occupant of the seat according to this invention.

Referring to FIG. 1, the vehicle seat 10 is supported on a frame 14, and includes foam cushions 16 and 18 on the seat bottom and back. The capacitance sensor 12 is disposed in or under the foam cushion 16 substantially parallel with the central seating surface, and provides an output signal on line 20 indicative of the capacitance of a seat occupant. A relative humidity sensor 22 and a temperature sensor 24 are located in proximity to the capacitance sensor 12, and provide electrical output signals oil lines 25 and 26 indicative of the seat humidity SEAT_HUM and seat temperature SEAT_TEMP.

As also shown in FIG. 1, the seat 10 is equipped with a conventional shoulder/lap seat belt 28 anchored to the vehicle floor (not shown) and B-pillar 30. In use, the belt 28 is drawn around an occupant or through the frame of a child or infant seat, and a clip 32 slidably mounted on the belt 28 is inserted into the buckle 34 to fasten the belt 28 in place. A retractor assembly (not shown) mounted in the B-pillar 30 maintains a desired tension on the belt 28, and locks the belt 28 in place when the vehicle experiences significant deceleration. A belt tension sensor 36 detects the tension applied to seat belt 28, and provides an electrical signal (BTS) indicative of the tension magnitude on line 38. The tension sensor 36 may be located in the B-pillar 30 as shown, near the floor on the outboard side of seat 10, or in any other convenient location, and may be constructed as disclosed, for example, in Research Disclosure No. 41402. October, 1998, Page 1304, incorporated herein by reference.

The capacitance, humidity, temperature and seat belt tension signals on lines 20, 25, 26 and 38 are provided as inputs to a passenger occupant detection system electronic control unit (PODS ECU) 40, which in turn, is coupled to an airbag control module (ACM) 42 via bi-directional communication bus 44. The ACM 42 may be conventional in nature, and operates to deploy one or more airbags or other restraint devices (not shown) for vehicle occupant protection based on the vertical and/or horizontal acceleration signals obtained from vertical acceleration sensor (V) 48 and horizontal acceleration sensor (H) 46, and occupant characterization data obtained from PODS ECU 40. In general, ACM 42 deploys the restraints if the acceleration signals indicate the occurrence of a severe crash, unless the PODS ECU 40 indicates that deployment should be suppressed. Of course, other more sophisticated controls are also possible, such as controlling the deployment force of the restraint devices based on the occupant characterization data provided by PODS ECU 40. Also, ACM 42 communicates the suppression status to a driver display device 50 to enable the driver to verify that the system has properly characterized the seat occupant.

In the illustrated embodiment, the primary function of PODS ECU 40 is to determine whether deployment of the inflatable restraints should be allowed or suppressed based on the various input signals mentioned above. However, it is known that in actual vehicle usage, the sensed capacitance for a given seat occupant will vary to some extent even under static conditions due to differences in temperature, humidity, seat belt tension, and seat cover tension. Of course, vehicle movement and occupant movement can cause significant variation of the sensed capacitance. Thus, it is difficult to accurately distinguish a child occupant from a small adult occupant under all circumstances by simply comparing the sensed capacitance to a fixed threshold. Accordingly, an important aspect of the present invention involves identifying major factors influencing the sensed capacitance, and using such factors to adjust the threshold in a direction that minimizes the overall system variability. In the illustrated embodiment, the major factors that can be identified include the free capacitance of the occupant, the seat belt tension, the seat humidity and the seat temperature. For example, if the seat belt tension (as measured by the sensor 36) is relatively high, the sensed capacitance will be skewed higher than would otherwise be expected, and the capacitance threshold is adjusted upward in relation to the measured tension to minimize variability of the occupant status determination due to higher-than-normal seat belt tension. Likewise, if the relative humidity (as measured by sensor 22) is higher than normal, the output capacitance will be skewed higher than would ordinarily be expected, and the capacitance threshold is adjusted upward in relation to the amount by which the measured humidity deviates from a normal humidity range. And finally, the capacitance threshold is adjusted upward when the occupant free capacitance is estimated to be relatively low, and downward when the occupant free capacitance is estimated to be relatively high; this also minimizes variability by increasing the likelihood that deployment will be allowed for an adult (high free capacitance) occupant, and suppressed for a child (low free capacitance) occupant.

According to another aspect of this invention, the free capacitance of the seat occupant is estimated by considering the variation of the capacitance signal output (that is, $\Delta$CAP) with respect to variations in acceleration measured by vertical acceleration sensor 48. Considering the above-mentioned factors that affect the capacitance sensor output signal variability, the overall variability ($\Delta$CAP) may be considered as the sum of several components, as follows:

$$\Delta CAP = \Delta CAPzero + \Delta CAPsb + \Delta CAPfc + \Delta CAPenv + \Delta CAPom \quad (1)$$

where $\Delta$CAPzero is the variation in the capacitance signal that occurs even when the seat 10 is empty due to seat cover tension and so forth, $\Delta$CAPsb is the variation in the capacitance signal due to seat belt tension, $\Delta$CAPfc is the variation in the capacitance signal due to the effects of vehicle movement on the occupant free capacitance, $\Delta$CAPenv is the variation in the capacitance signal due to environmental conditions such as temperature and humidity, and $\Delta$CAPom is the variation in the capacitance signal due to occupant movement. Since CAXPzero, CAPsb and CAPenv are substantially constant for at least short time intervals, the components $\Delta$CAPzero, $\Delta$CAPsb and $\Delta$CAPenv will be small, and $\Delta$CAP may be considered as the sum of $\Delta$CAPfc and $\Delta$CAPom over a suitably short interval. Also, the component $\Delta$CAPom can be minimized by ignoring (filtering) substantial excursions of the output signal, since occupant movement typically results in output signal shifts that are much higher than signal shifts due to vertical acceleration of the vehicle. With these assumptions, the overall variability in the capacitance sensor output ($\Delta$CAP)) may be expressed as:

$$\Delta CAP = \Delta CAPfc = \Delta ACCEL*(FCc/s + FCoc) \quad (2)$$

where $\Delta$ACCEL is the change in vertical acceleration of the vehicle, FCc/s is the combined capacitance of the cushion 16 and sensor 12, and FCoc is the free capacitance of the seat occupant. Thus, the combined free capacitance (FREE_CAP) of the occupant, the cushion 16 and the sensor 12 may be estimated as:

$$FREE\_CAP = K(\Delta CAP/\Delta ACCEL) \quad (3)$$

where K is a constant, and FCoc may be estimated as:

$$FCoc = K(\Delta CAP/\Delta ACCEL) - FCc/s \quad (4)$$

Figure 2:
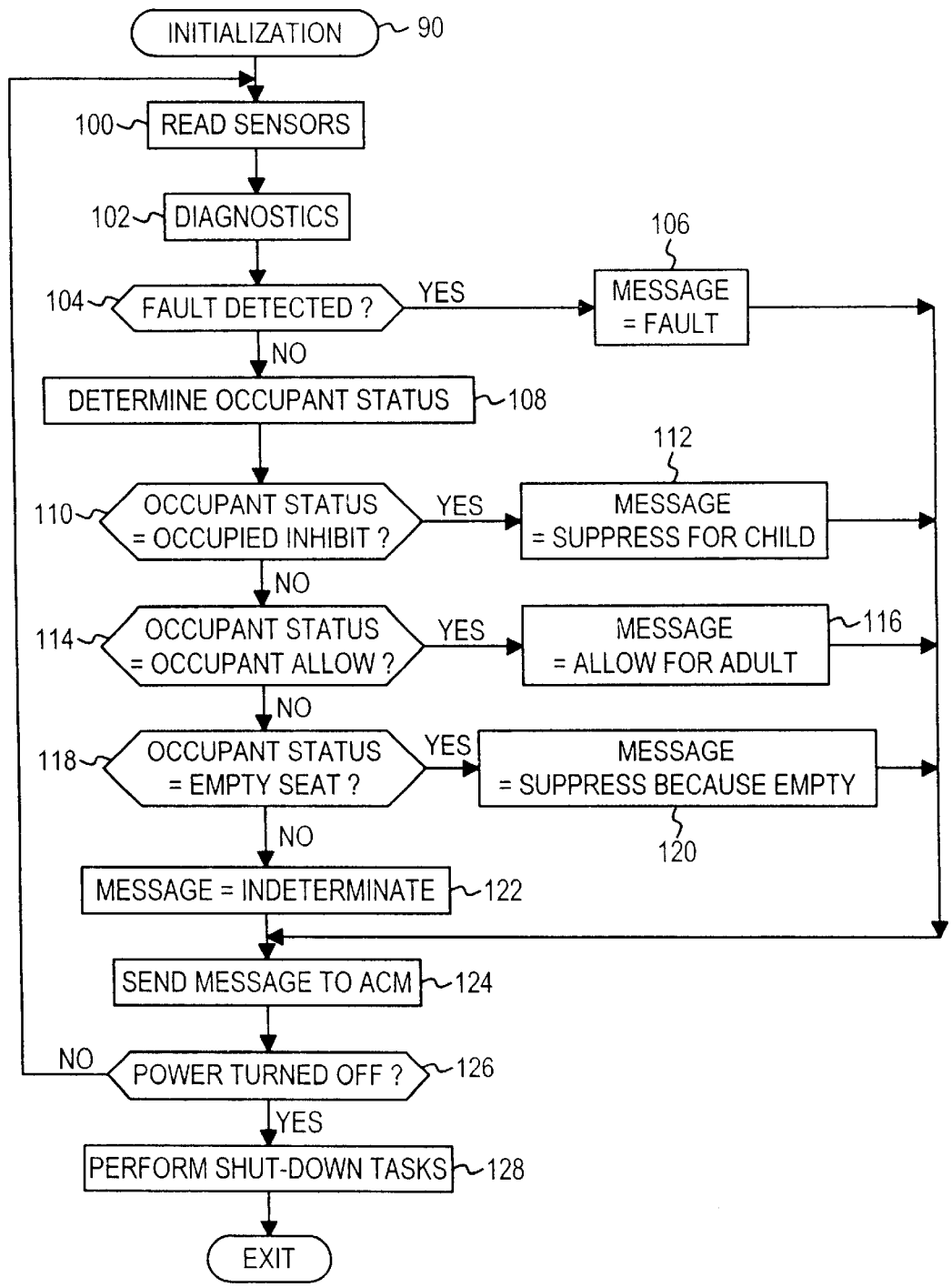
FIGS. 2, 3 and 4 depict a flow diagram representative of a software routine executed by the PODS ECU of FIG. 1 in carrying out the method of this invention.

The flow diagrams of FIGS. 2–5 illustrate a software routine periodically executed by the PODS ECU 40 for carrying out the above-described method. The flow diagram of FIG. 2 represents a main or executive routine, whereas the flow diagrams of FIGS. 3–5 detail occupant status determination.

At the initiation of each period of vehicle operation, the PODS ECU 40 executes an initialization routine as indicated by block 90 of FIG. 2 for initializing various registers, parameters and flags to zero or some other default setting. In the case of this invention, for example, the suppression status (STATUS) may be initialized to a default setting, or to a setting determined in the previous ignition cycle, and the threshold adjustment THR_ADJ may be initialized to zero. A similar initialization also occurs in the event of a dynamic reset. Following initialization, the blocks 100–126 are repeatedly executed as shown. The blocks 100 and 102 read all of the sensor information mentioned above in reference to FIG. 1 and perform diagnostic testing of the system and components. If the diagnostic testing detects a fault, the block 104 is answered in the affirmative, and the block 106 sets the status message to FAULT. Otherwise, the block 108 is executed to determine occupant status as detailed in the flow diagrams of FIGS. 3–5. If the occupant status is OCCUPIED INHIBIT, as determined at block 110, the block 112 sets the status message to SUPPRESS FOR CHILD. If the occupant status is OCCUPANT ALLOW, as determined at block 114, the block 116 sets the status message to ALLOW FOR ADULT. And if the occupant status is EMPTY SEAT, as determined at block 118, the block 120 sets the status message to SUPPRESS BECAUSE EMPTY. If blocks 110, 114, and 118 are answered in the negative, the block 122 sets the status message to INDETERMINATE. The block 124 then sends the determined occupant status message to ACM 42, and the block 126 checks for removal of system power. When system power is removed, the block 128 is executed to perform shut-down tasks, and the routine is exited.

Figure 3:
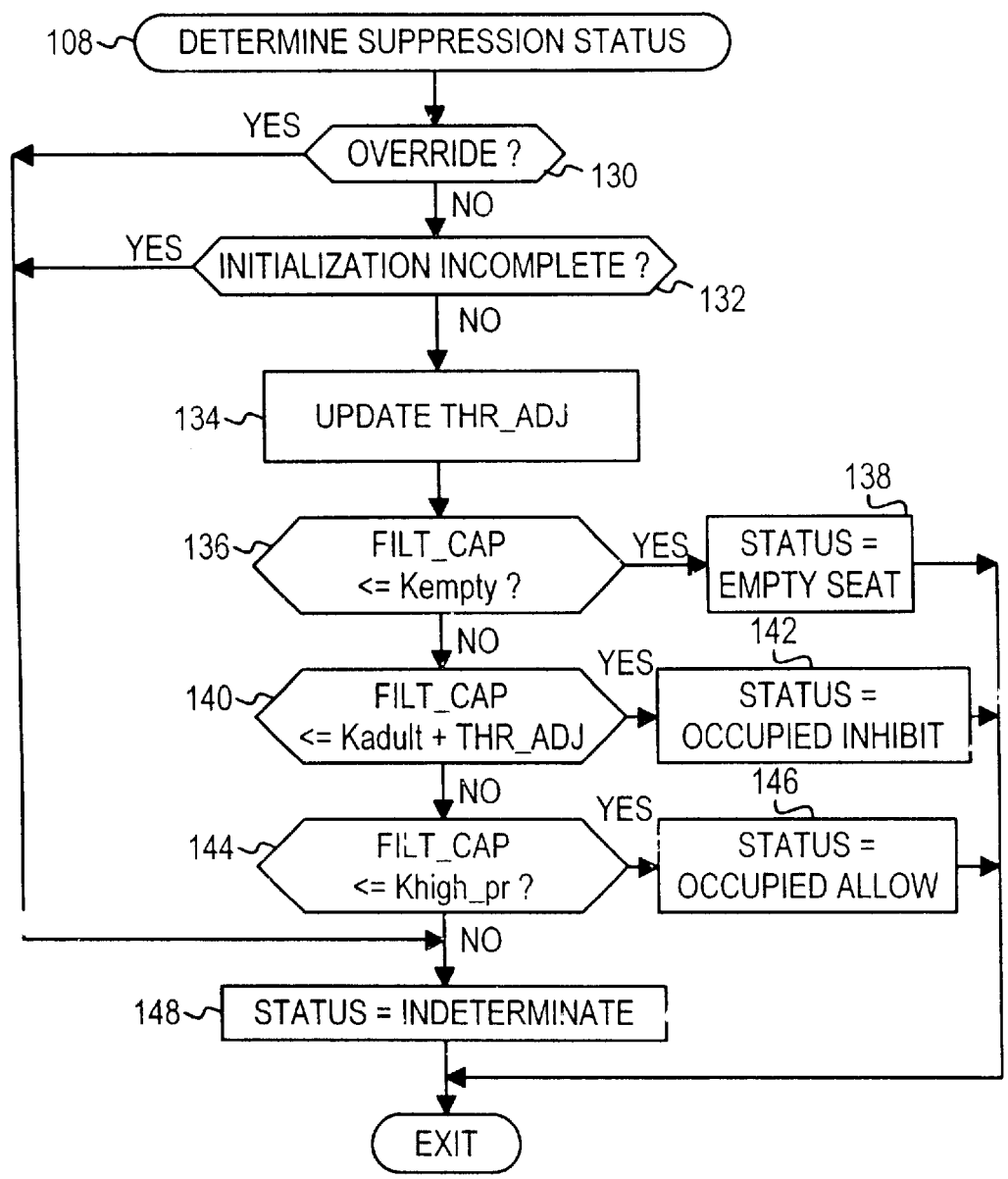
Figure 4:
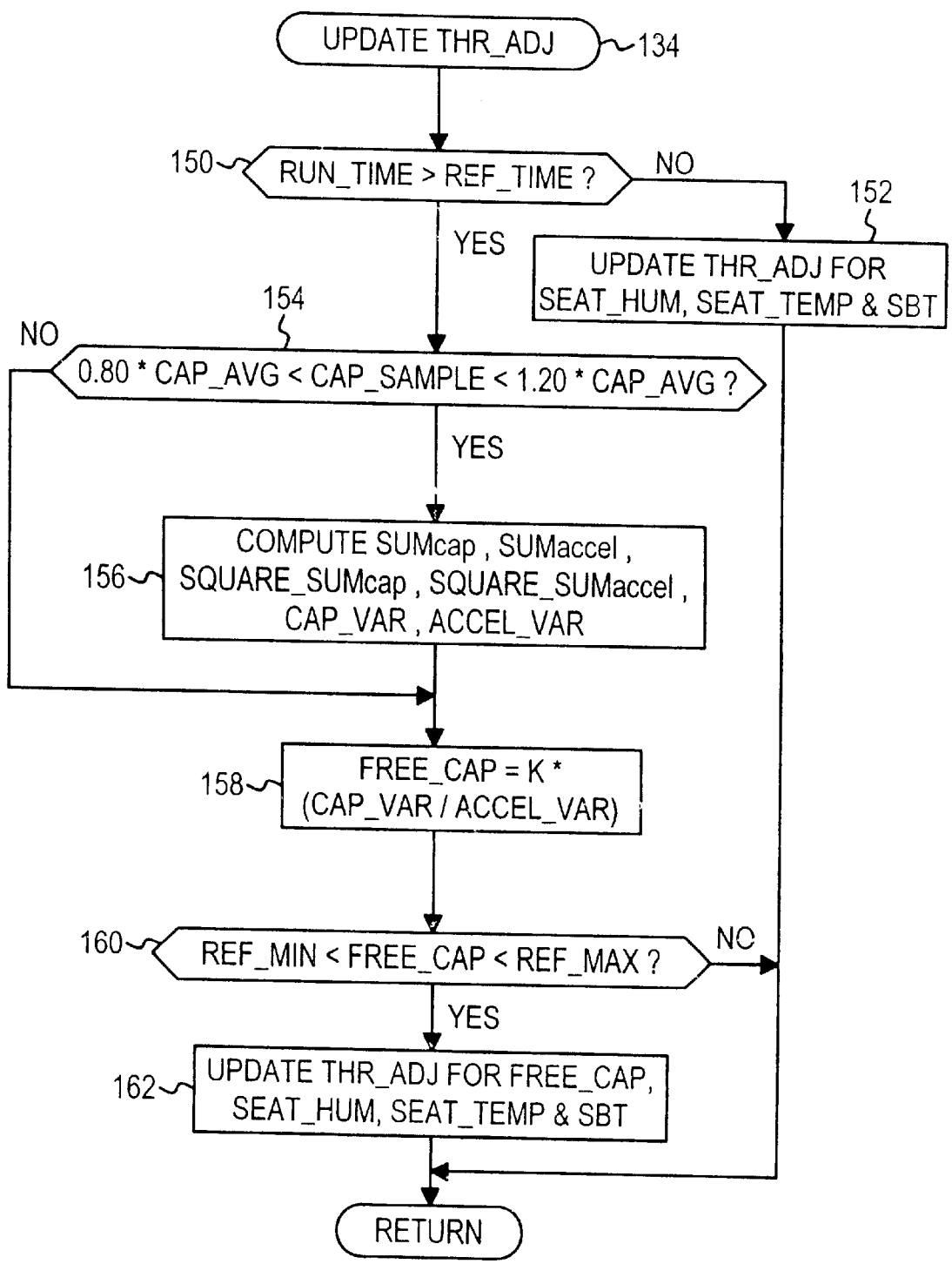
Figure 5:
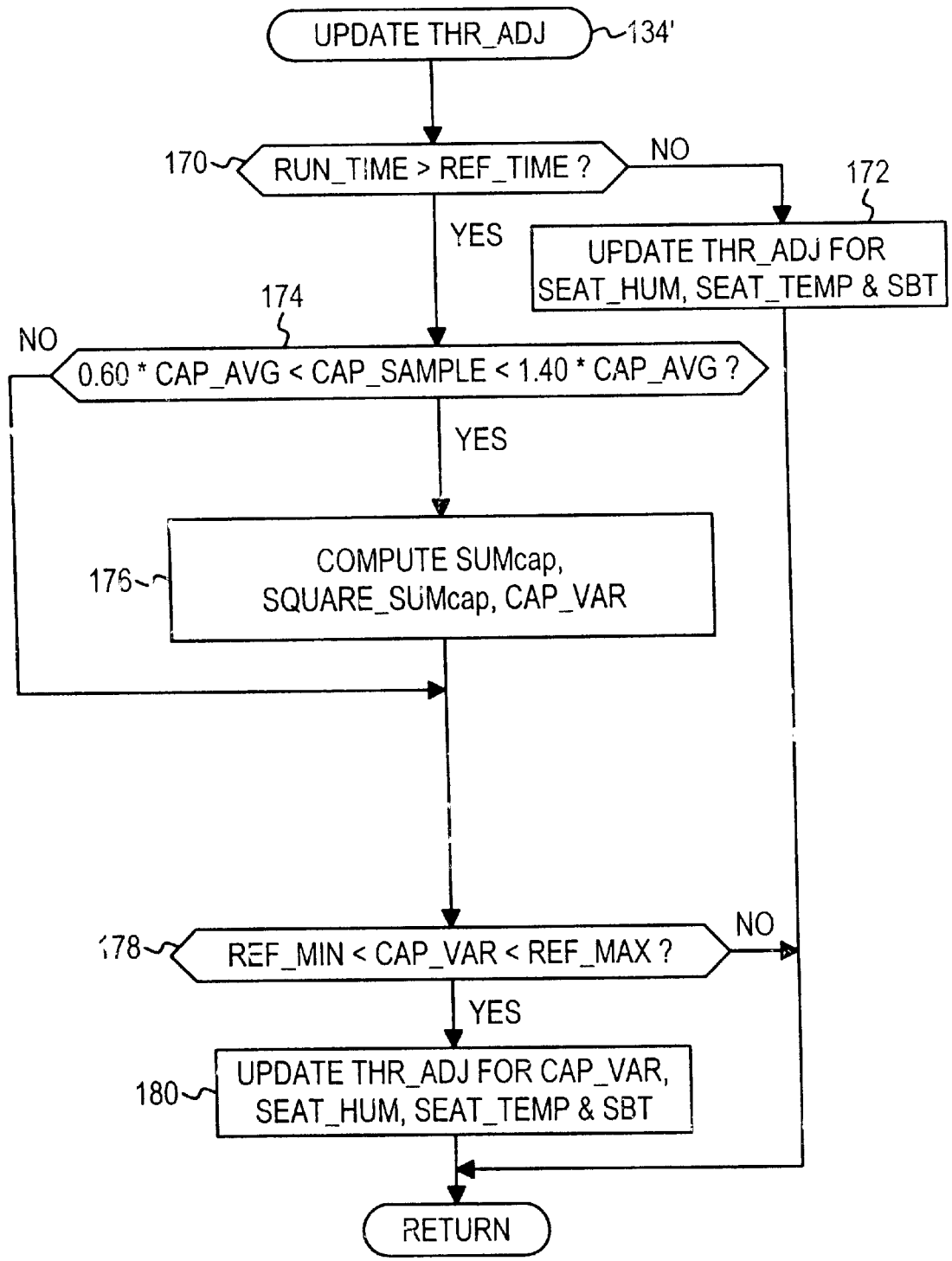
FIG. 5 is a flow diagram illustrating an alternate embodiment of the routine portion depicted in the flow diagram of FIG. 4.

Referring to FIG. 3, determining the suppression status generally involves comparing, a filtered version of the capacitance sensor output (FILT_CAP) to various thresholds. Initially, the blocks 130 and 132 are executed to determine if there has been a driver-override of the occupant sensing system or if system initialization has not been completed. In either case, the block 148 is executed to set STATUS to INDETERMINATE, and the routine is exited. Usually, however, blocks 130 and 132 will be answered in the negative, and the block 134 is executed to update the threshold adjustment THR_ADJ based on FREE_CAP, SEAT_HUM, SEAT_TEMP and SBT, as detailed in the flow diagrams of FIG. 4 or 5. FIG. 4 illustrates an embodiment where the vertical acceleration signal ACCEL is available to PODS ECU 40, whereas FIG. 5 illustrates an embodiment where the vertical acceleration ACCEL is unavailable.

If FILT_CAP is less than or equal to a predetermined low threshold Kempty indicative of an unoccupied seat, the blocks 136 and 138 detect the condition and set STATUS to EMPTY, completing the routine. If FILT_CAP is greater than Kempty, block 140 compares FILT_CAP to an adjustable threshold defined by the sum (Kadult+THR_ADJ), where Kadult is a default value of the adjustable threshold, and indicative of large child occupant (that is, an occupant slightly smaller than a $5^{th}$ percentile adult female, for example). The term THR_ADJ is determined at block 134 as mentioned above, and may be either positive or negative in sign to increase or decrease the value of the sum (Kadult+THR_ADJ). If block 140 is answered in the affirmative, the occupant is considered to be a child for whom deployment of the restraints should be suppressed, and block 142 is executed to set STATUS to OCCUPIED INHIBIT. If FILT_CAP exceeds the sum (Kadult+THR_ADJ) and is less than an unrealistically high threshold Khigh_pr, as determined at block 144, the occupant is considered to be an adult for whom deployment of the restraints should be allowed, and block 146 is executed to set STATUS to OCCUPIED ALLOW. If FILT_CAP exceeds Khigh_pr, a reliable indication of occupant position cannot be obtained, and the block 148 is executed to set STATUS to INDETERMINATE. Although not shown, the routine will preferably include a degree of hysteresis to prevent STATUS from toggling between two different states; once STATUS stabilizes in a given state, the hysteresis values can be increased to reduce sensitivity to road noise, occupant movement, and so on.

Referring to FIG. 4, updating the threshold adjustment THR_ADJ initially involves determining if RUN_TIME (that is, the time elapsed during the current driving cycle) exceeds a reference time REF_TIME, such as two minutes. If block 150 is answered in the negative, the vehicle is considered to be primarily stationary; in this case, dynamic variation of the capacitance signal CAP is significantly influenced by occupant movement, seat adjustment, etc., and the block 152 is executed to update THR_ADJ based on SEAT_HUM. SEAT_TEMP and SBT. As indicated above, THR_ADJ is increased in relation to SBT if SBT is higher than would ordinarily be expected, since such tension has the effect of skewing CAP higher than would occur with normal seat belt tension. In this case, increasing THR_ADJ increases the sum (Kadult+THR_ADJ), which proportionately increases the likelihood that the occupant will be characterized as a child (i.e., that STATUS will be set to OCCUPIED INHIBIT). The same is true of the measured relative humidity SEAT_HUM. On the other hand, THR_ADJ is decreased (adjusted in the negative direction) in relation to the deviation of SEAT_TEMP below a normal range of temperatures, since the cold temperature has the effect of skewing CAP lower than would occur in the normal temperature range. In this case, decreasing THR_ADJ decreases the sum (Kadult+THR_ADJ), which proportionately increases the likelihood that the occupant will be characterized as an adult (i.e., that STATUS will be set to OCCUPIED ALLOW).

Once RUN_TIME exceeds REF_TIME, the blocks 154, 156, 158 and 160 are executed to identify the free capacitance FREE_CAP the occupant based on a detected variation of the sensed capacitance CAP with respect to variation of the measured vertical acceleration ACCEL. The block 154 determines if the capacitance signal value CAP_SAMPLE determined at block 100 is within a predetermined percentage (20% in the illustrated embodiment) of a running average CAP_AVG of the capacitance signal. If not, the unusually high or low value of CAP_SAMPLE is considered due to occupant movement, and is ignored for purposes of estimating the occupant free capacitance. However, if block 154 is answered in the affirmative, the block 156 is executed to update the acceleration variance ACCEL_VAR, and to use CAP_SAMPLE to update the capacitance signal variance CAP_VAR. This involves summing filtered values of the capacitance sensor output signal CAP and the vertical acceleration sensor output signal ACCEL, and calculating a sum of squares SQUARE_SUM$_{cap}$, SQUARE_SUM$_{accel}$ for each of the signals, as follows:

$$SQUARE\_SUM_{cap} = [SQUARE\_SUM_{cap} + CAP_f^2]/REF1 \qquad (5)$$

$$SQUARE\_SUM_{accel} = [SQUARE\_SUM_{accel} + ACCEL_f^2]/SAMPLES \qquad (6)$$

where SUM$_{cap}$ is the summation of the capacitance signal values, SUM$_{accel}$ is the summation of the acceleration signal values, SAMPLES is the number or summed values, and the subscript f indicates a filtered value. Then, the variance CAP_VAR of the capacitance sensor signal and the variance ACCEL_VAR of the acceleration sensor signal are calculated as follows:

$$PS\_VAR = SQUARE\_SUM_{cap} - (SUM_{cap}/SAMPLES)^2 \qquad (7)$$

$$ACCEL\_VAR = SQUARE\_SUM_{accel} - (SUM_{accel}/SAMPLES)^2 \qquad (8)$$

The block 158 then estimates the combined free capacitance FREE_CAP of the occupant, cushion 16 and sensor 12 according to the ratio CAP_VAR/ACCEL_VAR, using equation (3) above. As a practical matter, the execution of block 158 should be skipped if ACCEL_VAR is a very low value in order to avoid dividing by a small number, and also since the free capacitance estimate will be less reliable. So long as FREE_CAP is within a normal rang)e of values determined by the reference values REF_MIN and REF_MAX, the block 160 will be answered in the affirmative, and block 162 will be executed to update THR_ADJ based on FREE_CAP, SEAT_HUM, SEAT_TEMP and SBT. As indicated above, THR_ADJ is adjusted upward in relation to the amount by which FREE_CAP is below a range of values that ordinarily occur with a small adult, and downward in relation to the amount by which FREE_CAP is above such range of values. This has the effect of minimizing system variability by increasing the likelihood that that STATUS will be set to OCCUPIED ALLOW for an adult (high free capacitance) occupant, and that STATUS will be set to OCCUPIED INHIBIT for a child (low free capacitance) occupant.

As indicated above, the flow diagram of FIG. 5 illustrates an alternative UPDATE THR_ADJ routine (designated by the reference numeral 134') where the vertical acceleration ACCEL is unavailable. In this case, the threshold adjustment term THR_ADJ is updated based on CAP_VAR instead of FREE_CAP so long as CAP_VAR is within a window defined by REF_MIN and REF_MAX, as indicated at blocks 178 and 180. Of course, computation of the acceleration variance term is eliminated, at indicated at block 176. Also the predetermined percentage of block 174 (corresponding to block 154 of FIG. 4) is enlarged from 20% to 40% in order to reliably discriminate signal variation due to occupant movement from signal variation due to vehicle movement. The blocks 170 and 172 correspond directly to the blocks 150 and 152, respectively, of FIG. 4.

In summary, the method of this invention provides a simple and effective way of utilizing both static and dynamic occupant capacitance-responsive data in a complementary fashion to more reliably determine if deployment of inflatable restraints should be allowed or suppressed. While illustrated in reference to the illustrated embodiment, it is expected that various modifications will occur to persons skilled in the art. Accordingly, it should be understood that occupant characterization methods incorporating these and other modifications may fall within the scope of this invention, which is defined by the appended claims.

What is claimed is:

1. A method of determining whether to allow or suppress deployment of a vehicular inflatable restraint for a vehicle occupant based at least in part on an output signal of a sensor responsive to occupant capacitance relative to a vehicle seat, the method comprising the steps of:

comparing a filtered version of said output signal to a threshold having a default value corresponding to a predetermined occupant capacitance under a given set of conditions;

determining a value of a parameter that affects a magnitude of said output signal;

adjusting said threshold above or below said default value when the determined parameter value is outside a predetermined range of values; and allowing deployment of said restraint when the filtered version of said output signal is above said threshold, and suppressing deployment of said restraint when the filtered version of said output signal is below said threshold.

2. The method of claim 1, wherein said parameter is a free capacitance of the vehicle occupant, the method including the steps of:

measuring a vertical acceleration of the vehicle;

determining a value of said free capacitance based on a variation of said output signal with respect to a variation of the measured vertical acceleration;

adjusting said threshold below said default value when the determined value of said free capacitance is above a predetermined range of free capacitance values corresponding to an average capacitance occupant; and adjusting said threshold above said default value when the determined value of said free capacitance is below the predetermined range of free capacitance values.

3. The method of claim 2, wherein the step of determining a value of said free capacitance includes the steps of:

sampling output signal values and computing an average of the sampled values;

identifying sampled output signal values that are within a specified percentage of said average;

computing a first variance of the identified output signal values;

computing a second variance of the measured vertical acceleration; and determining the value of free capacitance according to a ratio of the first variance and the second variance.

4. The method of claim 2, including the steps of:

measuring a vehicle run time; and delaying the step of determining the value of said free capacitance until the measured run time reaches a predetermined threshold.

5. The method of claim 1, wherein said vehicle seat is equipped with a seat belt for restraining said occupant, and said parameter is a tension of said, seat belt, the method including the steps of:

measuring the tension of said seat belt; and adjusting said threshold above said default value when the measured tension is above a predetermined normal range.

6. The method of claim 1, wherein said parameter is a temperature of said vehicle seat, the method including the steps of:

measuring said temperature; and adjusting said threshold below said default value when the measured temperature is below a predetermined normal range.

7. The method of claim 1, wherein said parameter is a relative humidity of said vehicle seat, the method including the steps of:

measuring said relative humidity; and adjusting said threshold above said default value when the measured relative humidity is above a predetermined normal range.

8. The method of claim 1, wherein said parameter is a variance of said output signal, the method including the steps of:

adjusting said threshold below said default value when the variance of said output signal is above a predetermined range corresponding to an expected variance for an average weight occupant; and adjusting said threshold above said default value when the variance of said output signal is below the predetermined range.

9. The method of claim 8, including the steps of:

sampling output signal values and computing an average of the sampled values;

identifying sampled output signal values that are within a specified percentage of said average;

computing the variance of the output signal based on the identified output signal values.

* * * * *